United States Patent [19]
Bridges

[11] 3,771,815
[45] Nov. 13, 1973

[54] EXTENSIBLE STEP

[76] Inventor: Ralph F. Bridges, 6838 East Floral, Selma, Calif.

[22] Filed: Apr. 13, 1972

[21] Appl. No.: 243,815

[52] U.S. Cl. .............................................. 280/166
[51] Int. Cl. ............................................. B60r 3/02
[58] Field of Search .......................... 280/166, 164; 182/88; 105/443, 444

[56] References Cited
UNITED STATES PATENTS

| | | | |
|---|---|---|---|
| 2,797,104 | 6/1957 | Drobney | 280/166 |
| 2,118,557 | 5/1938 | Hamilton | 280/166 |
| 1,180,215 | 4/1916 | Weiss | 280/166 |
| 3,008,533 | 11/1961 | Haberle | 280/166 |
| 1,054,430 | 2/1913 | Major | 105/444 |

Primary Examiner—Robert R. Song
Attorney—Herbert A. Huebner et al.

[57] ABSTRACT

An extensible step particularly suited for use with recreational vehicles such as campers, mobile homes, trailers and the like. The step is characterized by a base frame mounting the step beneath the doorway of a recreational vehicle, a horizontally displaceable tread supported within the base frame, and a remotely controlled prime mover coupled with the tread for selectively imparting horizontally directed, substantially rectilinear motion to the tread for repositioning the tread relative to a stowed position beneath the vehicle and an operative position laterally extended therefrom.

3 Claims, 7 Drawing Figures

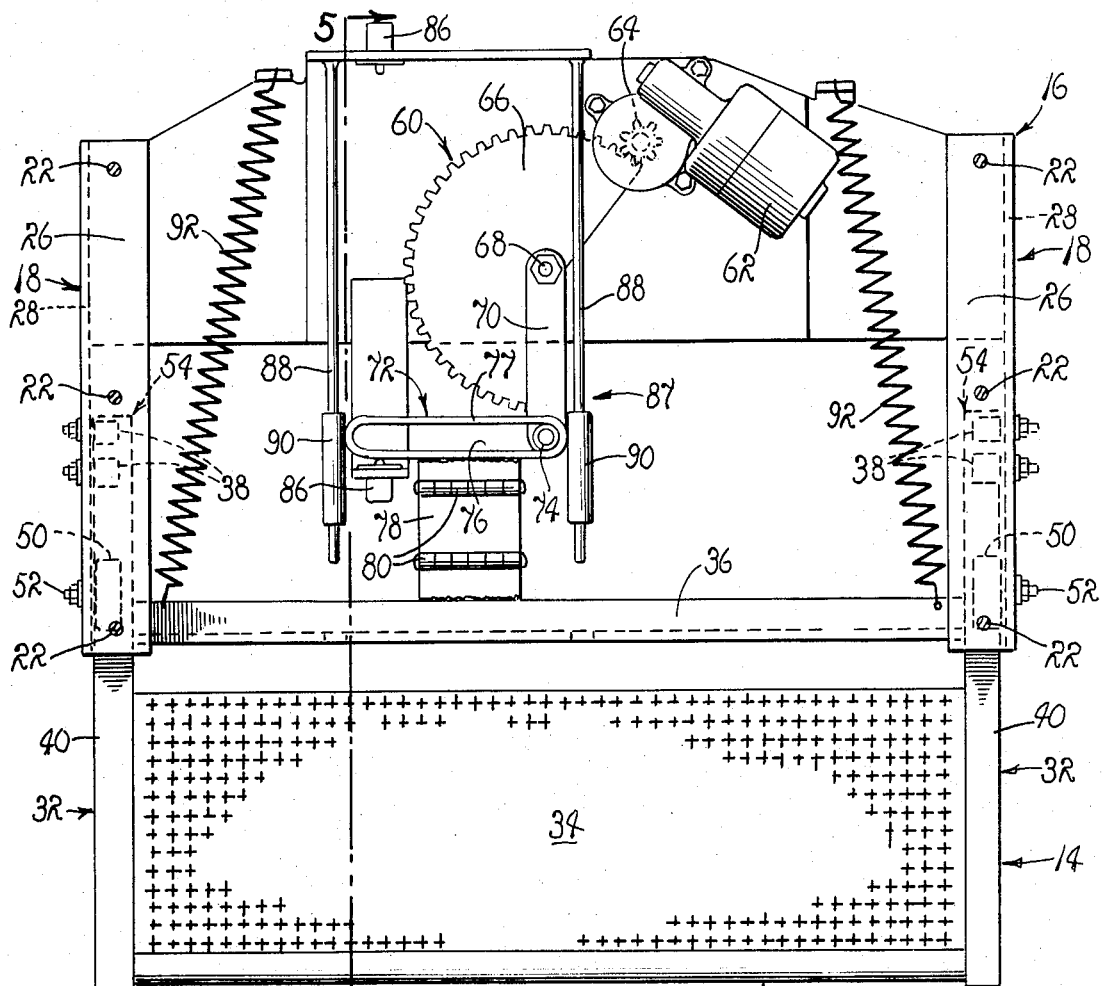

EXTENSIBLE STEP

BACKGROUND OF THE INVENTION

The invention relates to steps for vehicles and more particularly to a remotely controlled, extensible step particularly suited for use with a recreational vehicle of the type including campers, mobile homes, trailers and the like.

As is well unserstood, recreational vehicles, such as campers, mobile homes, trailers and the like are supported upon wheels which facilitate their being transported along highways, dirt roads, and often over relatively rough terrain. It heretofore has been common practice to provide a step suspended between the floor of the vehicle and the ground, or other supporting surfaces, for accommodating entry into the vehicle. In certain instances the steps have been welded in a fixed position to the frame of the vehicle. While such steps can be utilized by vehicles employed on smooth roadways, these steps normally extend from the vehicle and thus are hazardous, impractical, and often are deformed and even destroyed upon impact of boulders, trees, and the like, as the vehicle is moved over terrain of the type frequently traversed by such vehicles.

In order to overcome the noted deficiencies of rigidly supported steps, various attempts have been made to provide steps which are removable during periods in which the vehicle is being transported to and from a place of use, and thereafter mounted in an operative position when the vehicle is at rest. Included within this type of step are stools and ladders which are employed as they rest upon the ground and then are stowed and transported within the vehicle, and pivotal steps which are attached to the vehicle and are repositionable relative thereto.

Of course, none of these types of steps provides an adequate solution to the problem of providing a step employable with such vehicles since, in each instance, an operator must "set-up" as well as stow the step while he is on the ground outside the vehicle. This inadequacy becomes particularly critical where the operator must gain access to the vehicle while the step is stowed aboard the vehicle. As can be appreciated, the aged, the infirmed, and the crippled frequently cannot accomplish this feat.

Therefore, it is apparent that there currently exists a need for an extensible step for aiding in gaining access to vehicles of the type including campers, mobile homes, trailers and the like which can be stowed and repositioned into an operative configuration through a selective energization of a control system having a selector switch mounted for manipulation aboard the vehicle.

OBJECTS AND SUMMARY OF THE INVENTION

It is therefore an object of the instant invention to provide a remotely controlled extensible step.

It is another object to provide an improved extensible step for use with recreational vehicles.

It is another object to provide an extensible step which can be supported beneath an operating vehicle and laterally extended therefrom into an operative configuration, through a manipulation of a remotely positioned selector switch.

It is another object to provide a simple, economical, and practical step having particular utility with recreational vehicles, such as campers, mobile homes, trailers and the like and controlled through an electrical circuit powered by a source of electrical energy.

It is another object of the instant invention to provide in a remotely controlled, extensible step of the type to be mounted beneath the doorways of recreational vehicles, a tread reconfigurable from a stowed configuration aboard the vehicle to an operable configuration laterally extended therefrom whereby an operator located aboard the vehicle can reconfigure the step without dismounting the vehicle.

These and other objects and advantages are achieved by providing an extensible step which includes a substantially rectangular frame for mounting the step beneath the doorway of a recreational vehicle, a tread of a planar configuration extended between and rigidly fixed to a pair of supporting beams, a pair of horizontally extended tracks for receiving therein said beams, and electrically energizable drive train including an electrical motor, an oscillating arm, and a lost motion linkage for imparting substantially rectilinear motion to the beams, whereby the tread is alternately deployed and thereafter stowed aboard the vehicle, and remote control means located aboard the vehicle.

BRIEF DESCRIPTION OF THE DRAWINGS

FIG. 4 is a plan view of the step, similar to the plan view of FIG. 2, but illustrating the step in its extended, deployed configuration.

FIG. 5 is a fragmented, sectioned elevation taken generally along lines 5—5 of FIG. 4.

FIG. 6 is a fragmented, sectioned elevation taken generally along lines 6—6 of FIG. 2.

DESCRIPTION OF THE INVENTION

Figure 1:
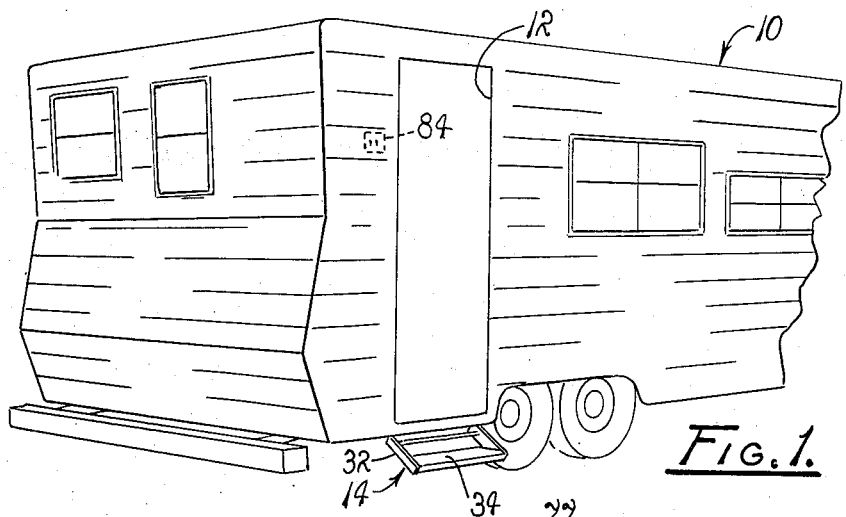
FIG. 1 is a fragmented, perspective view of a vehicle of a type having suspended therefrom an extensible step which embodies the principles of the instant invention.

Referring now to the drawings wherein like reference numerals designate like or corresponding parts throughout the several views, there is shown in FIG. 1 a recreational vehicle 10 having a doorway 12 beneath which is suspended an extensible step 14 embodying the principles of the instant invention.

The vehicle 10 is depicted as a mobile home, however, it is to be understood that the step 14 has utility with various other types of units including campers and house trailers. Furthermore, while the step 14 is depicted as being employed from one side of the vehicle 10 it is to be understood that the step can be employed beneath the doorway regardless of its orientation for accommodating access to the vehicle.

Figure 2:
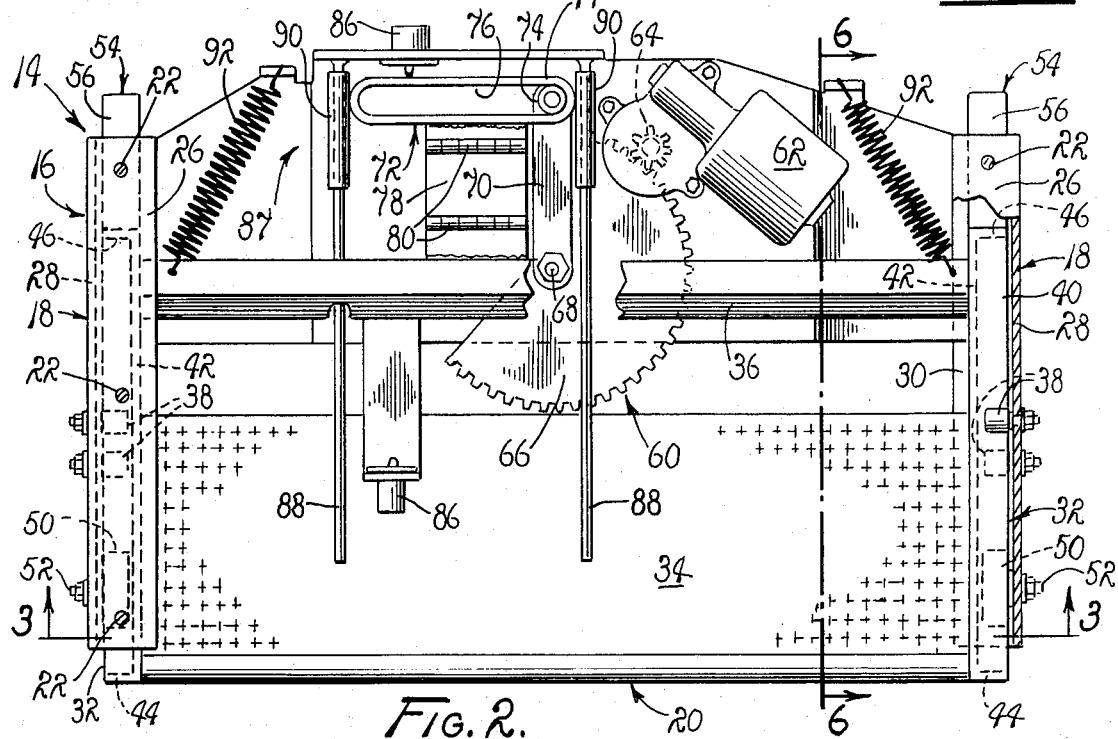
FIG. 2 is a plan view of the step illustrated in FIG. 1, illustrating the step in its retracted, stowed configuration.

As shown in FIG. 2, the step 14 includes a base frame, generally designated 16, adapted to be bolted, welded, or otherwise affixed to the supporting structure of the vehicle 10. The particular manner in which the frame 16 is mounted beneath the vehicle 10 is dictated primarily by the particular structure available in the vicinity of a doorway 12. The frame 16 preferably includes a pair of horizontally extended tracks 18 for receiving in telescoping fashion a tread assembly, generally designated 20.

Figure 3:
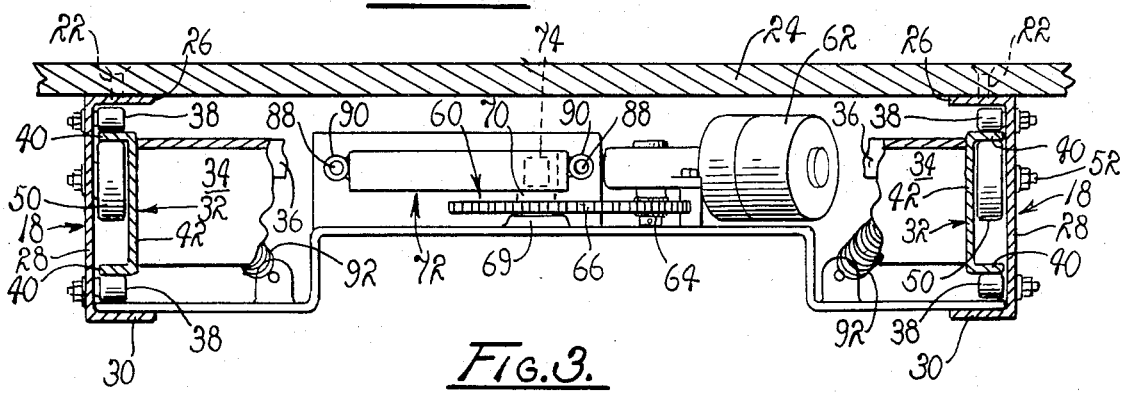
FIG. 3 is a fragmental elevational view taken generally along lines 3—3 of FIG. 2.

As best shown in FIG. 3, each of the tracks 18 is of a U-shaped configuration and, preferably is fabricated from suitably dimensioned channel iron. The base frame 16 is suspended by a plurality of hangar bolts 22 passed through a longitudinal beam 24 provided beneath the floor of the vehicle 10 and extended through an upper lip 26 of each of the U-shaped tracks 18. Depending from the upper lip 26 from each of the tracks 18 is a vertically disposed web 28 which terminates in a lower lip 30, similar to the lip 28, extended in substantial parallelism therewith. It is, of course, to be understood that the tracks 18 also are arranged in parallelism so that the webs 28 are arranged in parallelism. Thus, the tread assembly is confined at its opposite sides by the tracks 18 of the base frame 16.

The tread assembly 20 is provided with a pair of parallel rails 32 having extended therebetween a tread 34 of a substantially planar configuration. The tread 34 is extended between the rails 32 and is welded or otherwise rigidly coupled with the rails so that the rails and the tread 34 are rigidly integrated to a unitary configuration. The plane of the tread 34 is angularly related to the plane of the rails 32, as best illustrated in FIGS. 5 and 6, and is of a width substantially less than the length of the rails. However, the tread 34 preferably is positioned adjacent the distal end portions of the rails 32 and is supported along one edge by a transverse bar 36. The bar 36 also is extended between the rails and thus also serves to impart rigidity to the tread assembly 20. Consequently, it can be appreciated that the rails 32, the tread 34, and the bar 36 of the tread assembly 20 integrate the tread assembly 20 to a single unit of a rigid configuration.

The tread assembly 20 is supported within the base frame 16 by a plurality of roller bearings 38 suitably pinned to the webs 28 of the tracks 18. As best illustrated in FIGS. 5 and 6, the roller bearings 38 are appropriately positioned vertically spaced on the webs 28 of the tracks 18 a distance suitable for accommodating a reception of rails 32 therebetween. Thus, the tread assembly 20 is supported for rectilinear reciprocation along a substantially horizontal path extending from the base frame 16. As illustrated in FIG. 6, each of the tracks 18 is provided with only a pair of roller bearings 38. It should, however, readily be apparent that as many roller bearings 38 as found to be practical can be provided for supporting the tread assembly 20 within the base frame 16, so long as they are appropriately oriented. The orientation, of course, is such that rails 32 roll on the roller bearings 38 as the tread assembly 20 is extended and retracted relative to the base frame 16.

In practice, each of the rails 32 also is of a U-shaped configuration having a pair of substantially coplanar, longitudinally extending lips 40, the outer surfaces of which are received by the roller bearings 38. These lips, in turn, are coupled together through a vertical web 42, similar to the web 28. Preferably the lips 40 and web 42 of each of the rails 32 are coextensive and terminate at their distal ends in a transverse plate 44 while a transverse plate 46 is provided at their base for imparting strength and rigidity to the rails.

In practice, a skate roller 50 is pinned to each of the webs 28 of the tracks 18 by a bearing pin 42. As best illustrated in FIG. 3, the rails 32 and the rollers 50 are so oriented that the skate rollers 50 are received by the rails 32, whereby each of the skate rollers supportingly engage the lower surface of the upper lip 40 of each of the rails. As shown in FIG. 5, the skate rollers are so oriented on the web 28 as to engage the transverse plate 46 as the tread assembly 20 is extended from the base frame 16 and thus the rollers 50 effectively serve as stops for arresting the extension of the assembly 20. Furthermore, in view of the fact that only a pair of roller bearings 38 have been provided externally of each of the rails 32, each of the skate rollers 50 further functions to impart stability to the tread assembly.

As hereinbefore mentioned, the tread 34 is angularly related to the rails 32. Thus, in order for the tread 34 to be deployed into an operative configuration, it is necessary for the rails 32 to assume an inclined disposition, relative to a horizontal plane, upon being extended from the base frame 16. In order to achieve such an inclination of the rails 32, each of the rails is provided at its base end with a linear cam surface, generally designated 54.

As illustrated, each of the linear cams 54 includes an inclined plate 56, welded or otherwise secured to the base end of one of the rails 32, and is supported by an angular support plate 58 extended from the rail 32 to the distal end of the plate 56. The plate 58, of course, also is welded or otherwise rigidly affixed to the distal end of the rail 32.

As a practical matter, the cam 54 is inclined at an angle slightly greater than the angle of inclination assumed by the tread 34, so that once the rails 32 are extended relative to the base frame 16, the upper surfaces of the linear cams 54 ride on the uppermost roller bearings 36. When so disposed, the distal ends of the rails 32 are pivoted about the skate rollers 50 and extend downwardly from the base frame 16, so that the tread 34 is positioned in a horizontal plane between the floor of the vehicle 10 and the ground.

It is to be understood that the lower lips 30 engage the lower surfaces of the rails 32 while the upper lips 26 ingage the upper surfaces of the rails 32 as the tread assembly 20 is deployed in its operative configuration. The roller bearings 38 and the skate rollers 50 serve to support the tread assembly 20 in its stowed configuration within the base frame 16. Of course, the skate rollers 50 also limit the outward displacement of the track assebmly 20 relative to the base frame 16. Thus the step 14 is extended into and supported in its operative configuration which facilitates entry into the vehicle 10. As can readily be appreciated, retraction of the rails 32, for thus repositioning the tread assembly 20 in its stowed configuration within the base frame 16, causes the linear cams 54 to ride along the roller bearings 38 thereby pivoting the rails 32 about the skate rollers 50 as the tread assembly is retracted into the base frame 16.

The desired rectilinear motion imparted to the tread assembly 20 as it is extended and retracted is achieved through a drive train, generally designated 60. The drive train is powered by a reversible prime mover, preferably an electrically energizable motor 62. The motor 62 is mounted on the base frame 16 in a suitable manner and includes a pinion 64. The pinion, in turn is driven by gearing mounted in a suitable housing, not designated, and is driven by a suitable worm gear, also not designated.

Meshed with the pinion 64 is a gear sector 66 supported for oscillatory motion by a bearing-supported shaft 68. The shaft 68 is oriented in a vertical plane and is supported by suitable bearings mounted in a bearing housing 69, FIGS. 3 and 5. The gear sector 66 preferably is fixed to the drive shaft 68 and thus serves to impart rotation to the drive shaft in response to oscillatory rotation imparted thereto by the motor 62, through the pinion 64.

To the uppermost end of the shaft 68 there is affixed a laterally extended crank arm 70. The crank arm 70 is thus supported for 180° of throw as 180° of angular displacement is imparted to the drive shaft 68. At the distal end of the crank arm 70 there is provided a lost motion linkage 72, including a suitable bearing pin 74 pinned to the distal end of the crank arm 70. The bearing pin 74 rides in an elongated cam slot 76, formed in a bracket 77, normally related to the crank arm 70 when the arm is in either of its alternate rest positions, assumed as the step comes to rest in either of its alternate configurations. Thus, the cam slot 76 confines the bearing pin against motion paralleling the path traversed by the assembly 20, and yet permits the bearing pin 74 to advance unrestricted in a direction normal to that path, so that the pin 74 imparts rectilinear motion to the bracket 77 as the crank arm 70 is driven and thus angularly displaced by the shaft 68.

The bracket 77, in turn, is coupled with the transverse beam 36 through an articulated link 78 fixed at one end to the beam 36 and at its opposite end to the lost motion linkage 72. As a practical matter, the pivotal link 72 preferably includes a pair of parallel piano hinge joints 80 for accommodating the motion imparted to the base end of the tread assembly 20 as the assembly is reciprocated for alternately positioning it in its stowed and deployed configurations.

Figure 7:
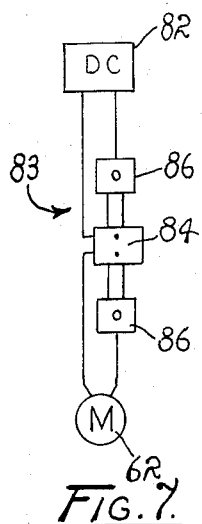
FIG. 7 is a schematic view of electrical circuitry employed in extending and retracting the tread into its stowed and deployed configurations.

As best illustrated in FIG. 7, the motor 62 is energized by a D.C. (direct current) voltage source 82, preferably an automotive battery found aboard the vehicle 10. The motor 62 and voltage source 82 are coupled within an electrical circuit generally designated 83. This circuit includes a manually operable, spring loaded button switch 84 and a pair of limit switches 86. The particular circuit through which the limit switches 86 and the button switch 84 are interconnected is varied as is found practical. However, it is to be understood that the limit switches 86 each, in turn, de-energize the motor 62 and upon de-energization of the motor, prepare the circuit for a reversed operation, when it again is energized in response to the closing of the circuit through the button switch 84. Of course, the button switch 84 is located at a suitable location aboard the vehicle 10. One such location is found immediately within the doorway 12 as illustrated in FIG. 1.

In practice, a guide assembly, generally designated 87, is provided for guiding the assembly 20 as it is reciprocated in response to an energization of the motor 62. In practice, the guide assembly 87 includes a pair of guide rods 88 affixed to the bracket 77 of the lost motion linkage 72 and seated for sliding, telescopic motion within a pair of horizontally oriented guide sleeves 90. These sleeves are secured to the base frame 16 and are employed in imparting lateral stability to the tread assembly 20 as it is reciprocated between its stowed and deployed dispositions. The guide rods 88 and the sleeves 90 thus inhibit binding of the tread assembly 20 within the base frame 16 by supporting it against lateral skew. As an additional aid to freedom of movement, and in maintaining lateral stability, a pair of tension springs 92 are coupled between the opposite ends of the bar 36 and the base frame 16 for thus supporting the assembly 20 against skew. Hence, it can be appreciated that the tread assembly 20 is in operation reciprocated without encountering binding resulting from skew.

OPERATION

It is believed that in view of the foregoing description the operation of the device will be readily understood, however, it will be briefly reviewed at this point.

With the extensible step 14 mounted beneath the doorway 12 of a vehicle 10, the tread assembly 20 is extended and retracted relative to the base frame 16 through a selective manipulation of the button switch 84 located within the vehicle 10.

To achieve the desired displacement of the tread assembly 20 an operator, within the vehicle 10, manipulates the button switch 84 for selectively applying an electrical voltage to the motor 62, from the voltage source 82. As the motor 62 is energized, the pinion 64 is driven in rotation for imparting angular displacement to the gear sector 66 for thus energizing the drive train 60. As the gear sector 66 is rotated, the crank arm 70 is caused to sweep an arc about the longitudinal axis of the drive shaft 68. Due to the effects of the lost motion linkage 72, the sweeping motion of the crank arm 70 is converted to rectilinear motion for imparting linear motion to the tread assembly 20 along a linear path relative to the base frame 16. The direction of the motion is, of course, dependent upon the direction in which the motor 62 drives the pinion 64.

Once the assembly 20 approaches a terminus of its path, the bracket 77 of the lost motion linkage 72 simultaneously approaches the terminus of its path. As this occurs, the switch 86 adjacent thereto is activated for interrupting the circuit 83 between the motor 62 and the voltage source 82. Thus, the motor 62 is de-energized and the motion of the tread assembly 20 is arrested. Once the motor 62 again is energized, through an appropriate manipulation of the switch 84, a reverse mode of operation is imposed on the motor 62 for reversing the direction of travel of the tread assembly 20 and the bracket 77 of the lost motion linkage 72.

It will be appreciated, in view of the foregoing, that as the tread assembly 20 is extended from the base frame 16, pivotal motion of the tread assembly occurs about the skate rollers 50 for permitting the tread 34 to drop to its deployed disposition. Likewise, upon a retraction of the tread assembly 20, the cam surfaces 54 pivot the rails 32 about the skate rollers 50 for causing the tread 34 to be elevated to a horizontal plane as the tread assembly 20 is retracted into the base frame 16.

In view of the foregoing, it should readily be apparent that the extensible step of the present invention provides a practical solution to the problem of affording access to vehicles such as campers, mobile homes, trailers and the like.

Although the invention has been herein shown and described in what is conceived to be the most practical and preferred embodiment, it is recognized that departures may be made therefrom within the scope of the Having described my invention, what I claim as new and desire to secure by Letters Patent is:

1. An extensible step for an elevated structure, exemplified by a wheel-supported vehicle, comprising:
   A. a displaceable tread assembly including a pair of laterally spaced support rails disposed in substantial parallelism and a planar tread extended between the rails and rigidly affixed thereto;
   B. means for supporting said tread assembly for rectilinear reciprocation along a substantially horizontally oriented path extended between a first location beneath a selected structure and a second location located in outwardly spaced relation with said structure, including a pair of horizontally extended tracks suspended from beneath the structure for receiving said rails in a supported relationship therewith; and
   C. drive means for imparting substantially rectilinear motion to said tread assembly comprising an electrically energizable motor, means for coupling said motor with said tread assembly including a drive shaft supported for rotation about an axis orthogonally related to said path, an elongated crank arm having its base rigidly affixed to said shaft and radially extended therefrom, means defining a lost-motion linkage for coupling the distal end of said crank arm with said tread assembly for imparting linear motion to the tread assembly as rotary motion is imparted to said shaft, a gear sector concentrically related to said shaft and rigidly secured thereto, and gear means connected with said motor and meshed with said gear sector for imparting rotary motion to the gear sector for thereby imparting linear motion to the tread assembly.

2. The extensible step of claim 1 further comprising:
   A. control means for said motor including an electrical circuit having connected therein a source of electrical energy; and
   B. switch means interposed in said circuit between said source of electrical energy and said motor for interrupting said circuit in response to linear motion imparted to said tread assembly.

3. In a remotely operated, extensible step of a type adapted to be mounted beneath the doorway of a recreational vehicle, such as a camper, trailer, mobile home and the like, the improvement comprising:
   A. a substantially rectangular frame having a pair of laterally spaced rails;
   B. a tread of a planar configuration extended between said rails and rigidly affixed thereto;
   C. a pair of horizontally extended tracks including therein bearing means for receiving and supporting said rails for reciprocation in a substantially horizontally oriented plane; and
   D. drive means for imparting horizontally directed, substantially rectilinear displacement to said rails, including a drive shaft supported for rotation about an axis orthogonally related to a longitudinal axis of said tracks, a reversely actuatable prime mover, a gear sector fixed to said drive shaft for imparting rotary motion thereto as rotary motion is imparted to the gear sector, gear means interconnecting said gear sector with said prime mover, whereby rotary motion is imparted to the gear sector in response to an activation of said prime mover, a crank arm extended in a substantially radial direction from said drive shaft, and means including a lost-motion linkage for coupling the distal end of said crank arm with said frame, whereby said tread is extended and retracted as the prime mover is reversely actuated.

\* \* \* \* \*